T. A. LONG.
LIQUID CARRYING AND LEVEL INDICATING DEVICE.
APPLICATION FILED NOV. 24, 1916.
1,242,215. Patented Oct. 9, 1917.
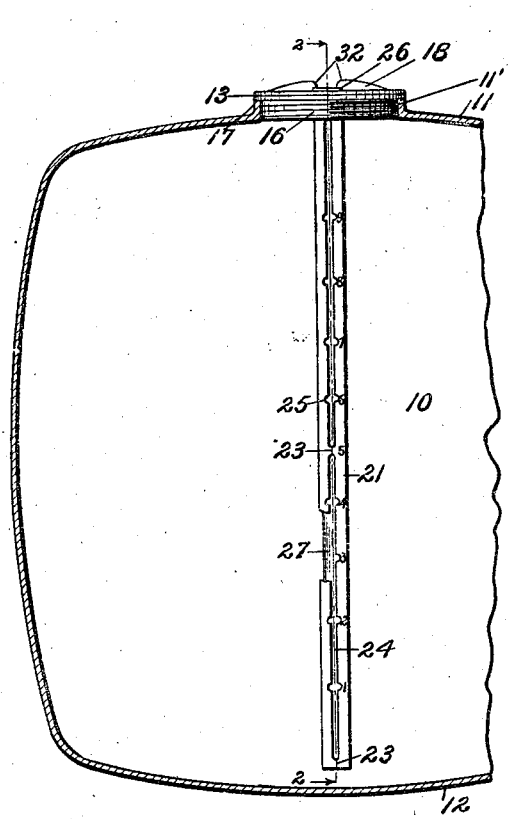
Fig. I.
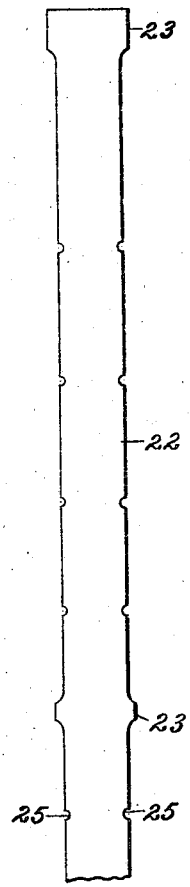
Fig. IV.
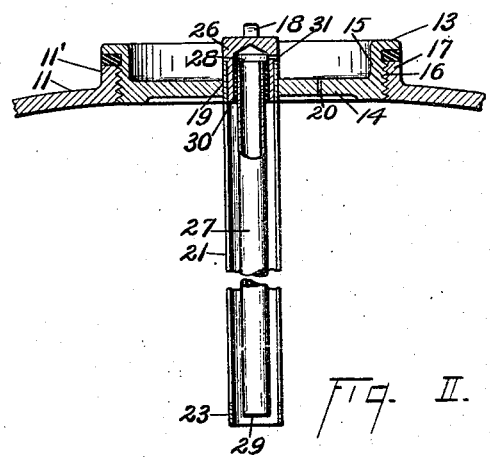
Fig. II.
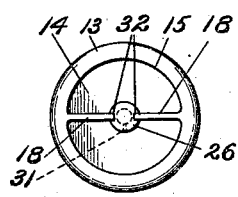
Fig. III.
INVENTOR
Thomas A. Long

UNITED STATES PATENT OFFICE.

THOMAS A. LONG, OF DETROIT, MICHIGAN.

LIQUID-CARRYING AND LEVEL-INDICATING DEVICE.

1,242,215.    Specification of Letters Patent.    Patented Oct. 9, 1917.

Application filed November 24, 1916. Serial No. 133,280.

*To all whom it may concern:*

Be it known that I, THOMAS A. LONG, a citizen of the United States, and resident of Detroit, Wayne county, State of Michigan, have invented certain new and useful Improvements in Liquid-Carrying and Level-Indicating Devices, of which the following is a specification.

This invention relates to liquid carrying and level indicating devices.

Two general types of liquid level indicating devices which have been previously used and which have more or less serious objections, are known as dial gages and measuring sticks. The dial gage may not be universally depended upon on account of the fact that it involves the use of moving parts which frequently seize or become inoperative. The measuring stick is not entirely satisfactory for the reason that the liquid may evaporate before the indicated level is accurately observed; or an inaccurate observation of the liquid level from the measuring stick may be made on account of the fact that the liquid may be caused to flow quickly above or below the previously indicated level on the stick by a tilting thereof. Another serious objection to previous measuring sticks is, that no satisfactory method of stowing or taking care of them when not in use has been suggested or provided.

To obviate these and other objections, I have provided a level indicating device which, while simple and inexpensive to manufacture, accurately indicates liquid levels, and is properly protected and stowed away when not in use.

Other objects and advantages accompanying the use of my improved device, will appear from the following description, taken in connection with the accompanying drawings, which form a part of this specification, and in which:

Figure 1 illustrates a transverse vertical section of a liquid receptacle embodying a form of my invention;

Fig. 2 is an enlarged vertical section substantially on the line 2—2 of Fig. 1;

Fig. 3 is a plan view of the cover and gage illustrated in the other figures; and Fig. 4 illustrates a detail of a preferred form of protecting tube.

Referring to the drawings, 10 illustrates a liquid receptacle, such as is used for carrying hydrocarbon fuels in motor vehicles. This receptacle comprises an upper wall 11, having a filling opening 11', and a lower wall 12. A detachable cover 13, comprising a bottom portion 14, and peripheral flange or rim 15, is threaded exteriorly as at 16, into a filling thimble 17. Integral lugs 18 are formed in the cap 13, extending inwardly from the flanged portion 15 to a point adjacent the center of the cover. An opening 19, and a vent 20, respectively, are formed in the bottom portion 14 of the cover.

A protecting tube 21, preferably of metal, is formed of two symmetrical stampings 22, which are adapted to be formed into semi-cylindrical members and to have their lugs 23 welded or soldered together, thereby forming a longitudinally extending slotted portion 24. The oppositely arranged notched portions 25, may serve as graduations as and for a purpose hereinafter described.

A plug 26 may be suitably brazed or otherwise secured to the upper end of the protecting tube 21, and a transparent tube 27, preferably of glass, having ports 28 and 29, at its upper and lower ends, respectively, may be arranged within the protecting tube 21, with a collar 30, preferably of rubber, between the tube 27 and the lateral wall of the plug 26.

It will be noted that the upper port 28 of the tube may communicate with the atmosphere through a lateral port or orifice 31, formed in the plug 26. The protecting tube 21, with all of the described parts assembled therein, is adapted to be inserted through the opening 19 of the cover 13, by a pressed fit with the head of the plug 26 abutting against the extreme inner ends 32 of the inwardly extending lugs or gripping members 18.

It will be noted that the plug 26 and tube 27, are so arranged that the orifice or lateral port 31 extends transversely to the lugs 18. When the cover 13 and assembled parts are arranged in the receptacle 10, the lower port 29 of the tube 27, will be arranged adjacent the bottom wall of the receptacle.

As the upper lateral port 31 for the tube 27 is normally open, liquid will flow through the lower port 29 to the interior of the tube 27 and up to the same level as that of the liquid in the receptacle. If it is desired to observe the level of the liquid within the receptacle, the cap or cover member 13 will be unthreaded to the point where it may be merely lifted from the opening 11'. Just prior to lifting the cap 13, the operator will grasp the cover by means of the inwardly extending gripping members 18. The parts are so proportioned that when the operator grasps the lugs 18 with two of his fingers, he is enabled to place a finger over the port 31, thus closing off its communication with the atmosphere. If the tube is withdrawn from the liquid with the upper port 31 closed off, as described, the liquid will remain in the tube 27 at the same level which was maintained while the tube 27 was arranged within the liquid. By observing the level of the liquid in the tube 27 through the slotted portion 24 of the protecting tube, and comparing the indicated level with the graduations or notched portions 25, the level of the liquid within the receptacle may be accurately determined.

If the receptacle were installed in a motor vehicle for carrying a hydrocarbon fuel, and it was desired to use a portion of the fuel for priming the motor, the liquid within the indicating tube 27 might be transported to the motor cylinders and a desired portion discharged therefrom, by regulating the admission of air to the interior of the tube 27 through the port 31. When the level indicating device is not in use, it is always properly protected and stowed within the receptacle 10.

While I have described and will specifically claim what I deem to be a preferred embodiment of my invention, it will be obvious to those skilled in the art that various modifications and changes may be made without departing from the spirit and scope hereof.

Having thus described my invention, what I claim and desire to secure by Letters Patent is:

1. In combination, a liquid receptacle having an opening arranged above the normal level of liquid therein, a detachable cover for said opening, and a substantially vertical tube in said cover extending to a point below the level of the liquid, said tube having valveless ports adjacent its upper and lower ends respectively, said upper port being laterally arranged in said tube and being adapted to be manually closed by a finger of an operator as said tube and cover are lifted thereby.

2. In combination, a liquid receptacle having an opening arranged above the normal level of liquid therein, a detachable cover for said opening, said cover having a centrally depressed portion and a substantially vertical tube in said depression and extending to a point below the level of the liquid, said tube having valveless ports, one being arranged adjacent its lower end and the other being laterally arranged adjacent said pressed portion, said upper port adapted to be manually closed by a finger of an operator as said tube and cover are moved from said opening thereby.

3. In combination, a receptacle having an opening in its upper wall, a detachable cover for said opening, and a transparent tube arranged substantially vertically in said cover and extending to a point adjacent the bottom of said receptacle, said tube having a port adjacent its lower end and a lateral valveless port adjacent its upper end, said cover having a lug formed thereon adjacent said upper port whereby said lug and port may be simultaneously gripped and closed, respectively by an operator.

4. In combination, a receptacle having an opening in its upper wall, a cover for said opening, a graduated tube arranged substantially vertically in said cover and extending to a point adjacent the bottom of said receptacle, said tube having a port adjacent its lower end, and a lateral valveless port adjacent its upper end, said lateral port being adapted to be closed and said cover to be lifted, simultaneously by the same finger of an operator.

5. In combination, a cap member, a tubular member mounted therein and having a longitudinally extending slotted portion, a transparent tube in said member, a flexible yielding collar between said tubes, said inner tube having valveless ports adjacent its upper and lower ends respectively.

6. In combination, a cap member comprising a bottom portion and a peripheral flange, said member having oppositely disposed inwardly extending lugs connecting with said peripheral flange, said member having an opening formed in its bottom portion between the inner ends of said lugs, a tube arranged in said opening and having valveless ports adjacent its upper and lower ends respectively, said upper port extending transversely to said lugs and adapted to be controlled by the fingers of an operator, as desired.

In testimony whereof I affix my signature.

THOMAS A. LONG.